United States Patent [19]
Mayeda

[11] 3,729,836
[45] May 1, 1973

[54] TEACHING APPARATUS
[76] Inventor: Wataru Mayeda, 1106 S. Wester, Champaign, Ill. 61820
[22] Filed: Apr. 10, 1967
[21] Appl. No.: 629,716

[52] U.S. Cl. ......................................... 35/6, 35/9 E
[51] Int. Cl. ............................................. G09b 13/00
[58] Field of Search .............................. 35/8, 9, 5, 6

[56]              References Cited
            UNITED STATES PATENTS

| | | | |
|---|---|---|---|
| 2,564,089 | 8/1951 | Williams et al. | 35/9 |
| 3,052,041 | 9/1962 | Luxton et al | 35/9 |
| 3,187,442 | 6/1965 | Hertsche | 35/9 |
| 3,191,315 | 6/1965 | Hannah | 35/9 |
| 3,212,199 | 10/1965 | Clark | 35/9 |
| 3,221,418 | 12/1965 | Hoevnes et al. | 35/9 |
| 3,281,959 | 11/1966 | Kobler et al. | 35/6 |
| 3,343,277 | 9/1967 | Kobler et al. | 35/6 |
| 3,353,280 | 11/1967 | Emde | 35/9 |
| 3,386,187 | 4/1968 | Kilby | 35/9 |
| 3,395,464 | 8/1968 | Leslie et al. | 35/9 |

*Primary Examiner*—Robert W. Michell
*Assistant Examiner*—J. H. Wolff
*Attorney*—Bacon & Thomas

[57]               ABSTRACT

A teaching apparatus having a keyboard, each key of which closes a switch; and cards to be fed through the machine, each card having for example a picture and the name of the article depicted, and driving means for stepping the card through a control station, the card having circuit conditioning means operable at the control station to successively condition predetermined circuits to the driving means for completion only by actuation of particular keys corresponding to the successive letters of the name. Masking means conceal those portions of the name approaching the control station and operation of a correct key causes the card to advance one step. The keys must be operated in proper sequence to correctly spell the name and thus advance the card through the machine.

11 Claims, 19 Drawing Figures

Patented May 1, 1973

INVENTOR.
WATARU MAYEDA
BY
Bacon & Thomas
ATTORNEYS

Patented May 1, 1973

INVENTOR.
WATARU MAYEDA
BY
Bacon & Thomas
ATTORNEYS

INVENTOR.
WATARU MAYEDA
BY Bacon & Thomas
ATTORNEYS

TEACHING APPARATUS

FIELD OF THE INVENTION

This invention relates to teaching apparatus and particularly apparatus for teaching wherein information is presented to the student, which information requires an answer that the student can present by operating a keyboard similar to a typewriter keyboard. For example, the information presented may be identification of an object and the answer to be elicited from the student may be the spelling of the name of that object by manipulation of the keys of the keyboard.

SUMMARY OF THE INVENTION

The description herein relates specifically to a machine for teaching spelling or arithmetic by requiring the student to manipulate the keyboard to select the proper sequence of letters or numerals constituting the name of an object depicted on a card or the answer to an arithmetic problem. The card is movable through the machine and is advanced along a path through a control section in response to operation of the proper keys, in sequence. It is to be understood, however, that other forms of information presentation may be used, as will be discussed later. A control station in the machine includes a plurality of switches conditioned by signal means on the card to partially complete an electric circuit through a driving motor. Each position of the card represents a particular letter of the name of the object, for example, and if the proper key is selected and operated by the student the circuit to the motor is completed and the motor operates to advance the card an additional step to position the next signal means in the control station. As disclosed, the card also bears the printed name of the article but the same is concealed from the student's view until successive letters have passed through the control station, at which time the letters are successively exposed, but only after having been properly selected by the student. The machine also includes a circuit controlling means to ensure that the card be advanced a full step at each actuation of a key, even though the key may be only momentarily operated and then released. After a card has passed completely through the control station it is deposited in a suitable receptacle. The machine also includes means for feeding successive cards from a supply thereof into operative position.

BRIEF DESCRIPTION OF THE DRAWINGS

FIG. 6 is an enlarged fragmentary vertical sectional view, taken on the line 6—6 of FIG. 5;

DESCRIPTION OF THE PREFERRED EMBODIMENT

Figure 1:
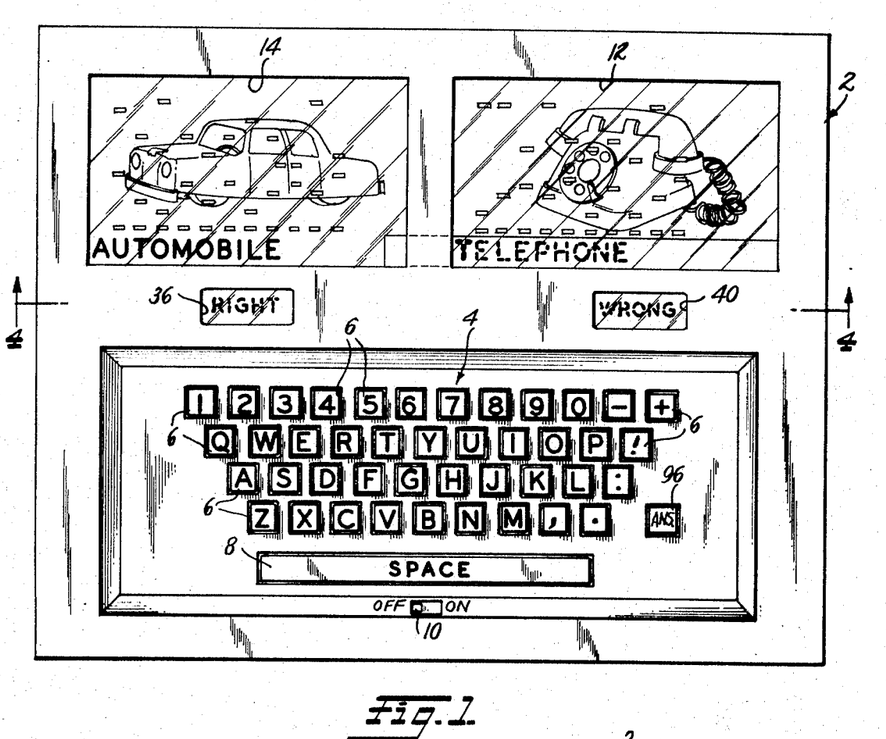
FIG. 1 is a plan view of one form of teaching apparatus embodying the present invention.
Figure 2:
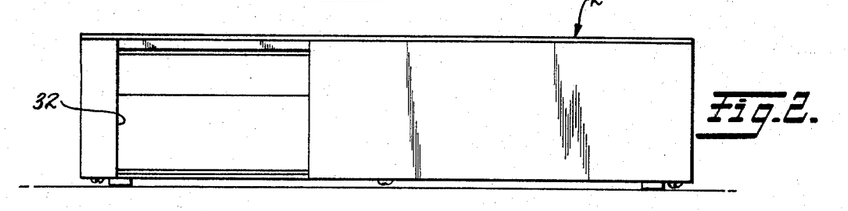
FIG. 2 is a left side elevational view of the apparatus of FIG. 1.
Figure 3:
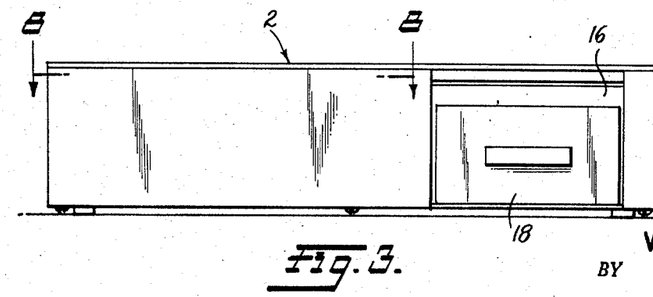
FIG. 3 is a right side elevational view of the apparatus of FIG. 1.
Figure 4:
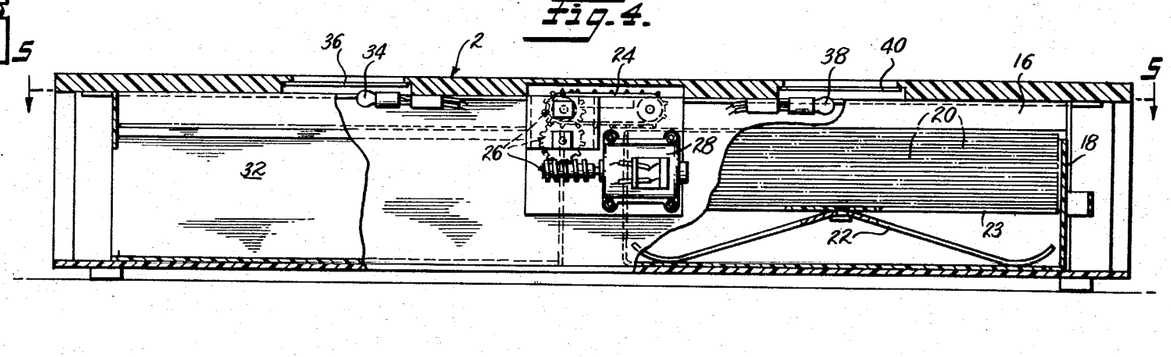
FIG. 4 is an enlarged vertical sectional view, taken on the line 4—4 of FIG. 1, but showing some parts in elevation.
Figure 5:
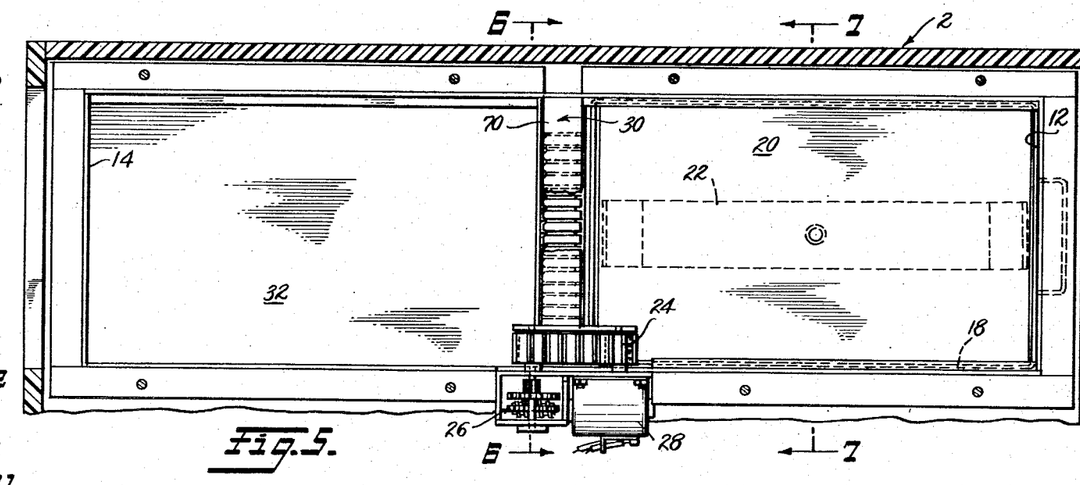
FIG. 5 is a fragmentary horizontal sectional view, taken on the line 5—5 of FIG. 4.

Referring first to FIGS. 1 to 9, numeral 2 represents the cabinet of the teaching apparatus disclosed. As seen in FIG. 1 the top of the cabinet is provided with a keyboard 4 comprising a plurality of keys 6 each having an alphabetical character or other identifying indicia thereon. Preferably the keys 6 correspond in number and identity to the keys of a standard typewriter. Each key, when depressed, closes a switch, as will be described in more detail later. The keyboard is also provided wth a spacebar 8 and an off-on switch 10. Rearwardly of the keyboard 4 the cabinet is provided with a pair of windows 12 and 14. Below the window 12 the cabinet defines a compartment 16 adapted to receive a drawer or similar container 18 in which a supply of cards 20 is stacked. A leaf spring arrangement 22 constantly urges a plate 23 supporting the stack of cards upwardly to the top of the cabinet immediately below the window 12. The lower left-hand end position of the top-most card of the stack (FIG. 4) is thus held in frictional engagement with a short endless driving belt 24. The belt 24 is of good frictional material such as rubber or the like and is connected, through gearing 26 to a driving motor 28, thus, when the motor 28 is energized it drives the belt 24 in a direction to move the upper card of the stack 20 toward the left, as seen in FIG. 4, in a manner to be further described. As seen in FIG. 5 means define a control station at 30, between the windows 12 and 14 and through which the top-most card 20 is moved by the belt 24. The motor 28 is energized when a correct key 6 is depressed, the key corresponding to that letter of the object for which certain signal means are then in the control station 30. After the name of the article depicted has been properly spelled by the sequential depression of keys 6 the card 20 is moved completely through station 30 and drops into a receiving compartment 32 beneath the window 14. At this time a new card is placed in position below the window 12 for another cycle of operation.

Each time a correct key 6 is depressed by the student and the motor 28 is energized a signal light 34 is also energized to indicate, in window 36 (FIG. 1) that the correct selection was made. If the student depresses an incorrect key a signal light 38 will be lighted beneath the window 14 of FIG. 1 to indicate to the student that he has not selected the proper key.

Figure 14:
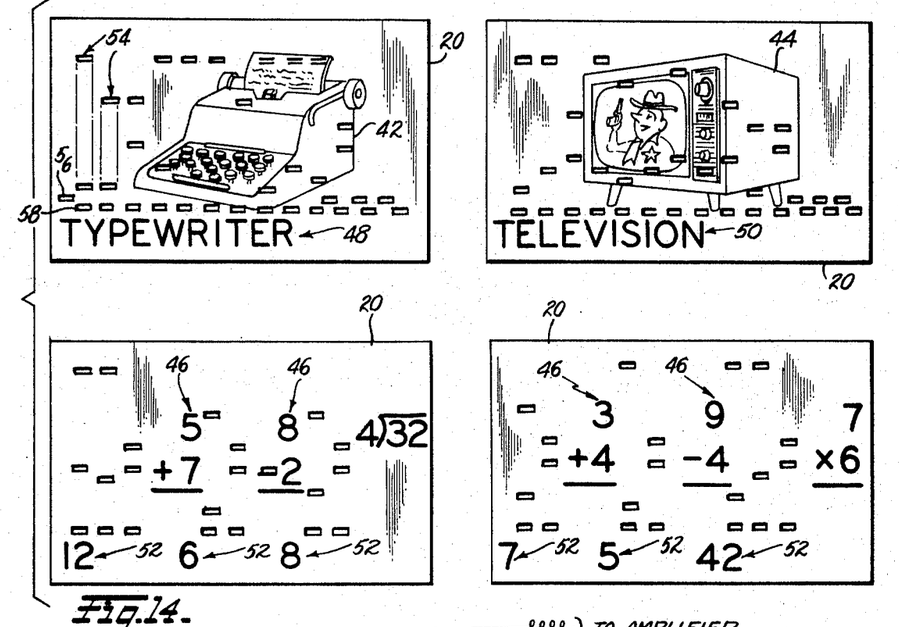
FIG. 14 is a plan view of a series of exemplary cards used in the present apparatus.

Referring now to FIG. 14 each of the cards 20 may be of cardboard or other suitable nonconductive material and each is provided with visual information imprinted thereon, such as the picture of a typewriter 42, the picture of a television set 44 or arithmetical problems 46. In addition to the problem or question presented by the picture or arithmetical expression, each card also has imprinted thereon the answer to the question presented, in the form of additional information, such as the name "typewriter" 48, "television" 50, or the numerical answer 52 to a problem. In addition to the above information each card is provided with vertical columns 54 of perforations. Each vertical column 54 of perforations comprises at least two perforations corresponding in position to a coded identity of the answer information, such as the letters of the name or the answer to the problem. For example, in the upper left-hand corner of FIG. 14 the upper two perforations in the left-hand column represent the first letter of the name, the two upper perforations in the second column represent the second letter of the name, etc. Suitable switch means in the control station 30, which will be described in more detail, are actuated by perforations 54 to condition electrical circuits that can be completed only by selection of a proper key 6. Each card also has further perforations arranged in horizontal rows 56 and 58, for a purpose to be described later.

Figure 8:
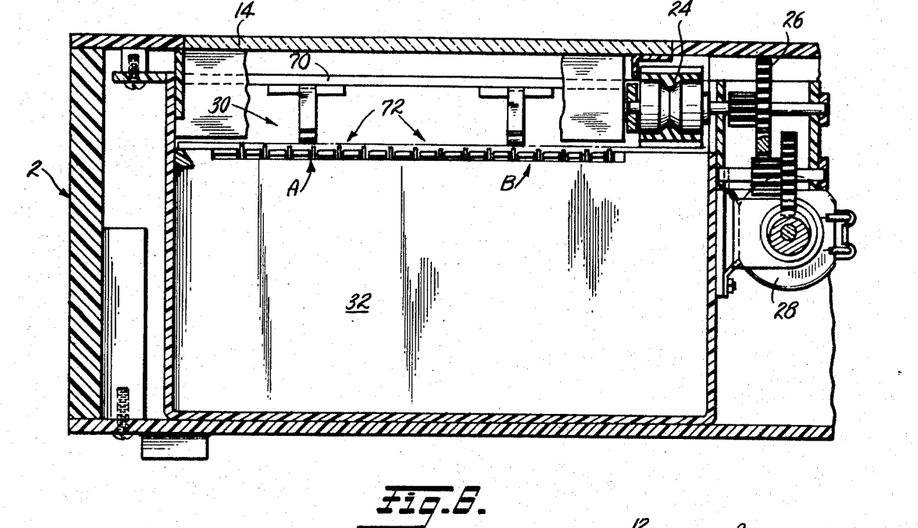
FIG. 8 is an enlarged fragmentary horizontal sectional view, taken on the line 8—8 of FIG. 3.
Figure 9:
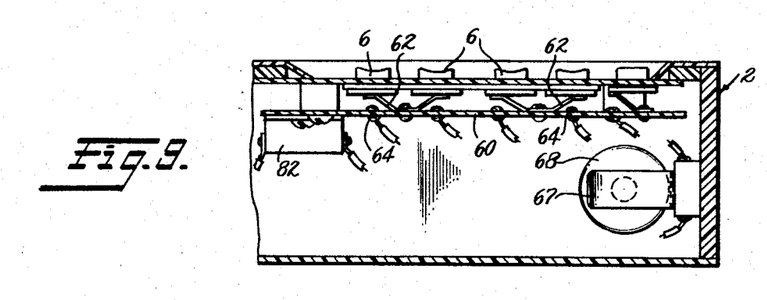
FIG. 9 is a fragmentary vertical sectional view, taken on the line 9—9 of FIG. 8.
Figure 10:
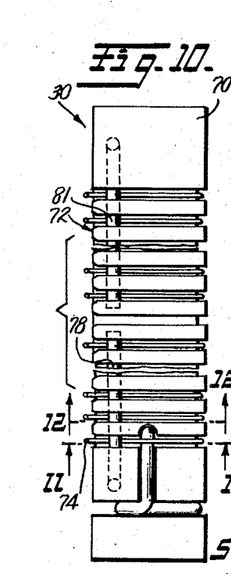
FIG. 10 is an enlarged fragmentary plan view of the selector switches in the control station of the teaching apparatus.

Referring now to FIGS. 8 and 9, a supporting platform 60 below the keyboard 4 is provided with a plurality of resilient switch arms 62, one such arm being beneath and engageable by each of the keys 6. Below each spring arm 62 is a contact 64 through which a circuit is closed upon depression of a key 6. As seen in FIG. 8, the contacts 64 are divided into a plurality of groups, all of the contacts of one group being connected to a common conductor 66. Likewise, certain of the spring arms 62 are interconnected by a common conductor, there being a group of such common conductors interconnecting different groups of srping arms. The common conductors connecting the spring arms, which conductors are not shown in FIGS. 8 and 9, are so arranged as to interconnect only one spring arm associated with each of the groups of contacts 64. There being at least one spring arm 62 of each of the groups shown or connected to a second common conductor, as will be more fully described later. As seen in FIG. 8 and 9, the cabinet 2 is provided with bracket or clip means 67 for holding dry-cells or batteries 68 to provide a source of electrical power for operation of the machine. It is to be understood, however, that alternating current may be employed by providing suitable transformers and/or rectifiers, as is well-known to those skilled in the art.

Figure 11:
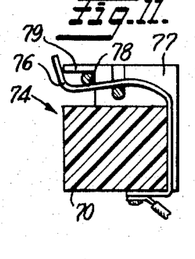
FIG. 11 is a vertical sectional view, taken on the line 11—11 of FIG. 10.
Figure 12:
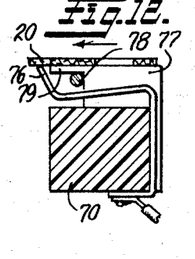
FIG. 12 is a vertical sectional view, taken on the line 12—12 of FIG. 10, but showing an instruction card in a position holding a selector or control switch open.
Figure 13:
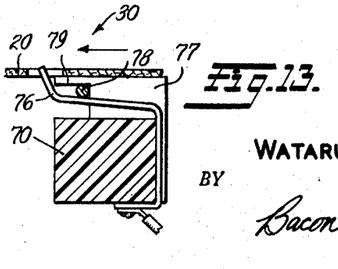
FIG. 13 is a vertical sectional view similar to FIG. 12 showing the card advanced, and with one of the selector switches in closed position, extending through a slot in the card.

Referring now to FIGS. 5, 10, 11, 12 and 13, the means defining the control station 30 includes a suitable nonconducting support member 70 having a plurality of switches designated generally at 72 mounted thereon. FIG. 11 shows the switch 74 which is aligned with the bottom row of perforations 58 described with reference to FIG. 14. As shown in FIG. 11, this switch comprises a spring arm 76 in a transverse groove 77 in member 70 and normally urged upward into contact with a conductor 78 which extends across the grooves 77 below a finger 79; however, when an unperforated portion of a card 20 is over the switch 74 in the control station 30 the spring arm 76 is depressed downwardly to a position such as shown in FIG. 12 where it no longer makes contact with conductor 78 and the switch is thus open. When a perforation in a card 20 reaches the proper position in the control station 30, a spring arm 76 may move upwardly, as shown in FIG. 13, whereby to make contact with conductor 78 and thus at least partially complete an electrical circuit. While FIGS. 11, 12 and 13 illustrate the structure of different switches of FIG. 10, it is to be understood that the structure of all switches may be substantially identical, the conductor 78, however, is associated with only some of the switches, as will be further described later.

Figures 17, 18:
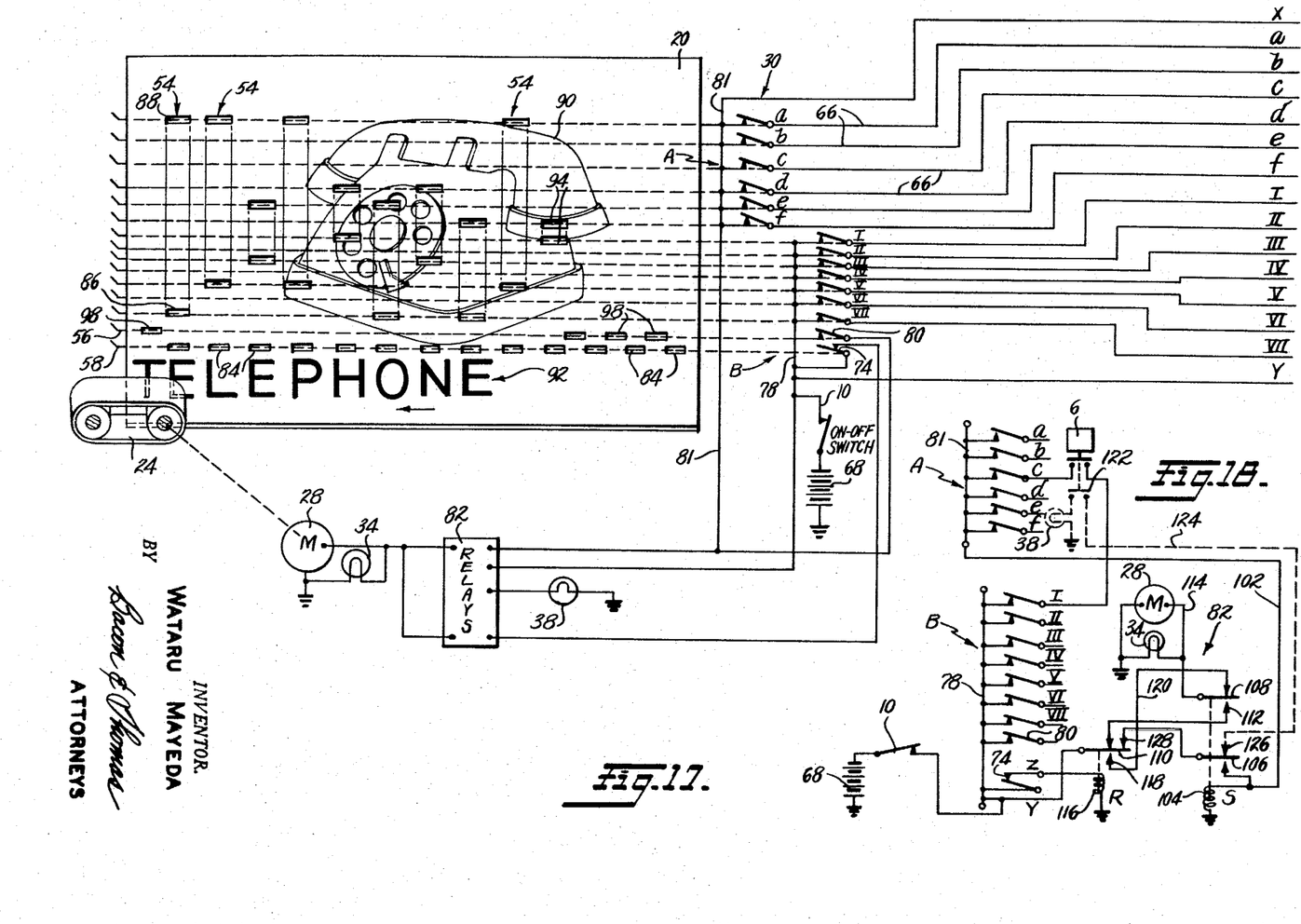
FIGS. 17 and 17A viewed together show a schematic circuit diagram of the arrangement of the components of the teaching apparatus.
FIG. 18 is an equivalent schematic diagram of portions of the circuit of FIGS. 17 and 17A with other portions shown in greater detail.
Figure 17A:
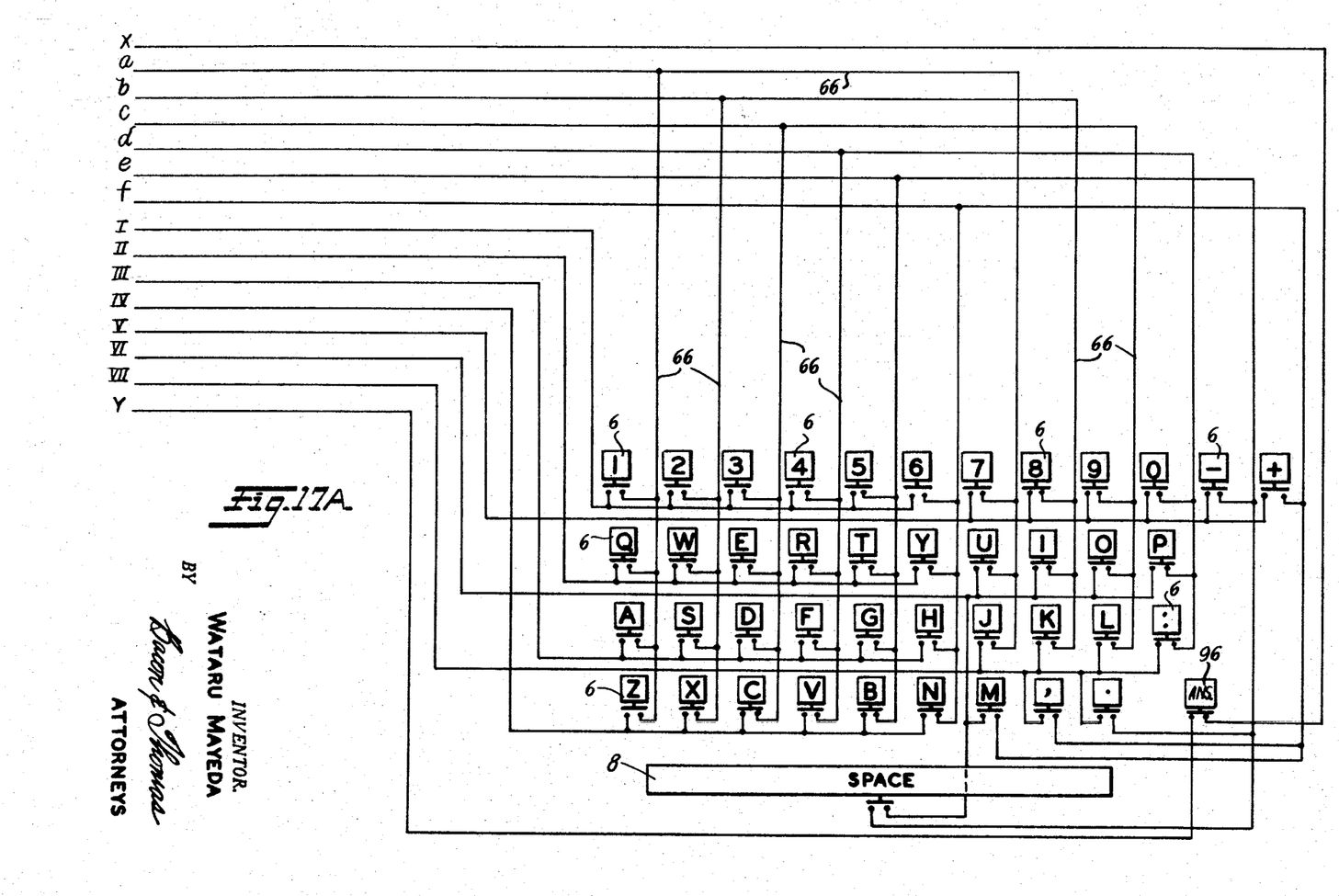

Referring now to FIGS. 17 and 17A, which together constitute a single schematic circuit diagram, the structural features previously described are shown only schematically to facilitate illustration. in FIG. 17, the group of switches in the control station 30 are shown as comprising two separate groups laterally offset but this is only for purpose of illustration, in the actual structure they are in physical alignment. Te switches in the control station 30 are divided into groups, A and B. Group A consists of 6 switches identified by the same lower-case letters which identify the wires leading thereto. The switches of group B are 9 in number and each is identified by the same Roman numeral by which the wire leading thereto is identified, with the exception of the bottom two switches 74 and 80. The conductor 78 is common to the switches of Group B whereas conductor 81 is common to the switches of Group A.

Referring now to FIG. 17A, it will be recalled that each of the keys 6 depresses a spring finger into contact with a fixed terminal 64. The spring fingers and fixed terminals are indicated in 17A as spaced contacts below their respective keys 6. It will be noted that a selected group of the keys, namely keys identified as 1, Q, A, Z, 7, U and J all have their right-hand contacts connected to the same common conductor 66 leading to conductor $a$ and switch $a$. This constitutes one group of keys all having one side of their switches connected to the same switch Group A in the control station. Similarly other groups of keys have their right-hand contacts connected, respectively, to the conductors $b$, $c$, $d$, $e$, and $f$, each of which is connected to a separate switch of Group A. The contacts so connected to the lettered conductors are shown as the right-hand switch contacts in FIG. 17A. The left-hand contacts of each key switch are also grouped in groups consisting of one key from each group of the groups just described. Thus, from the drawings it will be apparent that keys numbered 1, 2, 3, 4, 5 and 6 each heave their left-hand contact connected to conductor I and the corresponding switch in Group B in the control station 30. It will thus be apparent that selection of one switch from each Group A and B will identify only a single key 6 connected to both of them. Assuming that those two switches in the control station are closed, then actuation of the proper key 6 will complete a circuit from battery 68 through off-on switch 10 and conductor 78, through the selected switch of Group B, then through the switch closed by the proper key 6, then through the selected switch of Group A to the motor 28, through a relay assembly which is shown only schematically by block 82 in FIG. 17. For example, assume that a card 20 is positioned on the machine so that its coded information openings close switch c of Group A and switch III of Group B. By tracing the conductors c and III it will be seen that the only key connected to both those conductors is the key identified by letter D and thus depression of that key will energize the motor 28 to cause the card 20 to advance one step forwardly as already described. Obviously, movement of the card 20 will result in reopening the switches c and III thus breaking the circuit through the motor 28. However, the openings 84 in row 58 are so positioned that they will keep switch 74 closed until the card 20 has advanced a full step to position the next column 54 in the control station. It will be apparent that closing of switch 74 will complete a circuit from battery 68 through the relays of motor 28 until the spring finger of switch 74 is past the trailing end of an opening 84 which thus opens switch 74 and stops motor 28. The code openings or signal means in the columns 54 are, however, longer than the openings 84 so that the particular switches actuated thereby remain closed after switch 74 is opened.

In FIG. 17 the card 20 is shown as having 9 columns 54 and in each column there are 2 code signals or openings 86 and 88. Upper opening 88 of each column is aligned with one of the lettered switches of Group A, whereas the lower opening 86 of each column is aligned with one of the switches of Group B. The particular switches with which those openings are aligned constitute the coded information corresponding to one of the letters of the name of the article 90 depicted on the card. Obviously, the name of the article is "telephone" as imprinted at 92 and consists of nine letters, hence there are nine columns 54. A further pair of openings 94 is provided at each card following the last column 54. In every card used, the openings 94 are respectively aligned with switches f and I so that after actuation of the machine to complete the spelling of the word appearing thereon the openings 94 are in the control station and close switches f and I. The conductors corresponding to those switches are connected to a key 96 on the keyboard and identified in FIGS. 1 and 17A by the legend "ANS." After the oepnings 94 have been positioned in the control station the motor 28 is stopped and the card remains in that position to permit the student then to review what he has done. However, he may at any time depress button 96 which thereby completes a circuit through switches f and I and the motor 28 to cause the same to operate and advance the card.

Figure 7:
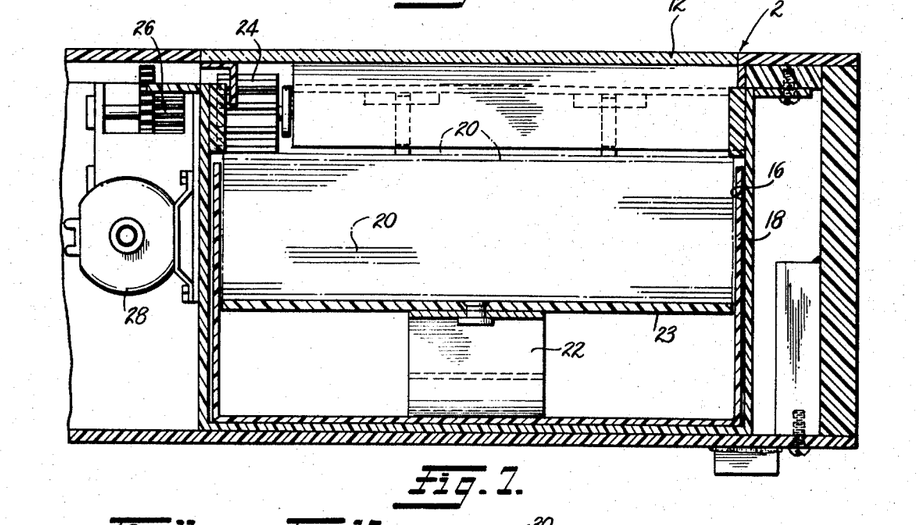
FIG. 7 is a fragmentary vertical sectional view, taken on the line 7—7 of FIG. 5.

Immediately above row 58 of openings 54 on the card 20 is another row of openings 98 constituting "start" and "end" signals. As is apparent from FIG. 17 the leading opening 98 of row 56 is in advance of any column 54 or opening 84 and is so positioned that when the topmost card 20 of a stack, as shown in FIG. 4, 5 and 7, is in the position described, the opening 98 is in a position below the switch 80 in the control station and that switch is thus closed. When switch 80 is closed a circuit is completed through the motor 28 to cause the same to operate to advance the card in the manner already described, to position the first column 54 in the control station. As shown in FIG. 17, additional openings 98 appear at the end of the row 56, intermediate the openings 84 in row 58. Thus, after actuation of the "ANS" button 96 the switches 74 and 70 will be alternately closed by the openings 98 and 84 to thus cause the motor 28 to operate continuously until the card 20 has been ejected from the control station and dropped into the receiving compartment 32.

In some instances the proper sequential operation of the keys 6 requires the spelling of two words separated by a space. When this occurs, the column 54 corresponding to the space between words is provided with a pair of openings arranged to close switch e of Group A and switch VI of Group B. It can be seen from the circuit diagram that depression of the spacebar 8 will close a switch in series with the switches thus closed in the control station and thus cause the card to advance through the "space" to the next column 54. In effect, therefore, the spacebar 8 is just another key on the keyboard.

As is also shown in FIG. 17 the indicator light 34 which indicates when a correct key 6 has been depressed is merely connected in parallel with the motor 28 so that energization of the mtoor 28 to advance the card 20 will also cause the indicator light 34 to light up.

FIG. 18 is a more detailed schematic diagram of the relay arrangement in block 82 and shows some portions of the circuitry illustrated in FIGS. 17 and 17A for purpose of illustration, only one key 6 being shown therein with its connections to the switches in the control station. Let it be assumed that a card 20 is in the control station 30 and that openings in a column 54 thereof have closed switches c and I. The key 6 shown in FIG. 18 is, therefore, the "correct" switch and when depressed will complete a circuit from battery 68 through common conductor 78, switch I, the key switch, switch c, a common conductor 81 for the switches of Group A then through conductor 102 to the coil 104 of relay S. When the coil 104 is energized it will draw the switch blades 106 and 108 away from the upper contacts and on to the lower contacts of relay S. At this time the relay R is deenergized and the operation described will thus complete a circuit from battery 68 through switch blade 110 of relay R and an upper contact thereof to the contact 112 of relay S (the blade 108 now being in the lower position) and then through conductor 114 to motor 28. This condition persists until the card has been moved far enough to move the column 54 out of the control station and thus open switches c I thereby deenergizing relay S. When that occurs, however, an opening 84 in row 58 closes switch 74 thus directly energizing coil 116 of relay R, throwing its switch blade 110 downwardly to engage lower contact 118 and close a circuit from the battery 68 through conductor 120 and switch blade 108 to the motor 28 to keep the motor running until the switch 74 is agian opened. The provision of the row 58 of openings 84 thus ensures that the motor will continue to run between columns 54 even though all of the switches in Groups A and B are open as the space between those columns passes through the control station. It will be apparent from FIG. 17 that the motor 28 will be energized when either of the relays R or S is energized but cannot run if both relays are energized. The switch 80 responsive to the openings 98 in row 56 is arranged to directly energize the motor 28 without energizing either relay R or S.

FIG. 18 also includes a dotted line showing of circuitry for actuating the signal light 38 which indicates depression of an incorrect key 6. The structure of this added feature is not shown, but is omitted from the other figures merely for simplicity of illustration. However, it comprises a second switch 122 operable by each key 6 when depressed. If the key 6 were an incorrect key, depression of the same would not energize the relay S as previously described and both relays R and S would remain inactive. However, under such conditions the switch 22 completes a circuit from ground through the signal light 38 and conductor 124 to an upper contact 126 of relay S. Thus a circuit is completed from the contact 126 to an upper contact 128 of relay R and thence to the battery 68, which results in lighting the signal light 38 without any other operation taking place.

In the event the word to be spelled by the student includes a double letter, that is, repetition of the same letter in two successive steps, the student cannot operate the machine through both steps by merely holding the one key depressed, it must be released and again depressed to show that the repeated letter actually appears twice. This is true because depression of a correct key will energize relay S, which will remain energized as long as the key is depressed and the corresponding control switches are closed. Even after the control switches are opened by movement of the card the switch 74 is then closed to energize relay R and with both relays R and S energized current cannot be fed to the motor 28 and the same will stop. Brief inspection of FIG. 18 will indicate this to be true.

Figure 15:
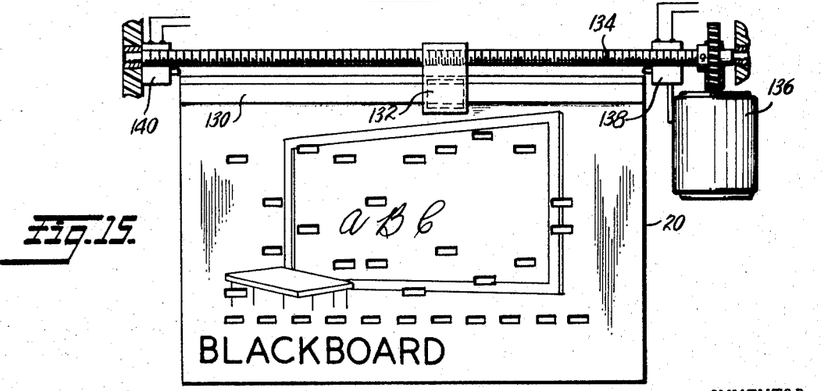
FIG. 15 is a fragmentary schematic plan view of a modified form of the device employing a card having a recorded message and a pick-up head.
Figure 16:
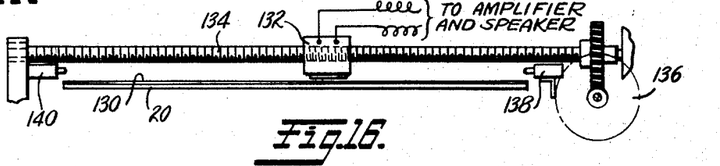
FIG. 16 is an end elevation of the device of FIG. 15.

Refer now to FIGS. 15 and 16. These figures illustrate a modified form of apparatus wherein a card 20 which may be identical in all respects to the cards previously described, is further provided with a strip 130 of magnetic tape along the upper edge thereof. The tape 130 may have recorded thereon any desired audio information related to the subject matter of that card. For example, the tape 130 on the card 20 shown in FIG. 15 could have recorded thereon the statement "This is a blackboard" or just the word "blackboard". In this embodiment, the machine comprises a pickup head 132 suitably connected in a circuit, not shown, to amplify and reproduce the sound recorded on the tape 130. The head 132 is caused to traverse the length of the tape 130 by means of a screw 134 driven by a motor 136. Suitable limit switches 138 and 140 are positioned at the ends of the tape 130 to limit and control movement of the reproducing head 132. In operation it is contemplated that the reproducing means thus described will be caused to operate as soon as a card 20 reaches its first position below window 12 and thus orally apprise the student of the subject matter involved on that card. Suitable control circuits, not shown, will be apparent to those skilled in the art whereby the reproducing means may be first operated and then the machine conditioned for manual operation in the manner already described.

If desired, a further keyboard switch could be provided, in parallel with switch 80, to reject any card by moving it through the control station to the compartment 32 at any time.

Obviously, the information on the card 20 need not be the pictures and words or the mathematical expressions described and shown, but may be any other information presenting a problem or question to the student and which may be answered by proper sequential operation of the keyboard. In addition, it is not necessary to the principles of the invention that the information be recorded on individual cards as described. The information could be recorded in any suitable manner on a continuous film having a supply reel in the compartment 16 and a takeup reel in the compartment 32. Furthermore, mechanical switches in the control station 130 are not essential, they could be photo-electrically sensitive devices responsive to optical signals recorded in the columns 54 or conductive spots on the record means, arranged to span fixed contacts in the control station. Other equivalent arrangements will be apparent to those skilled in the art. It is contemplated that other embodiments other than those specifically described and shown in the embodiments illustrated are contemplated within the scope of the appended claims.

I claim:

1. Teaching apparatus, comprising: record means having discrete bits of information recorded thereon in predetermined related sequence; means defining a reference station; driving means for intermittently moving said record means along a predetermined path to successively position said recorded bits of information in said station; a plurality of sensing means in said station, said sensing means comprising at least two groups of sensing switches, all sensing switches of each group having one side connected to a common terminal, said common terminals being separate; one of said common terminals being connected to a source of electric power, the other common terminal being connected to a motor for said driving means; each of said keys being arranged to close a corresponding keyboard switch, said keyboard switches being arranged in groups and one side of all keyboard switches of each group being connected to the other side of a corresponding sensing switch of one group of sensing switches; the other side of one switch of each group of keyboard switches being connected to the other side of a corresponding sensing switch of the other group; said bits of information each comprising at least two signals on said record means, each being arranged to actuate one switch of a corresponding group of sensing switches; a plurality of circuits for energizing said driving means; said sensing means being responsive to the recorded bit of information in said station, for closing a portion of one of said circuits; a keyboard having a plurality of keys bearing certain indicia related to the bits of information on said record means and each of which, when activated, closes another portion of one of said circuits, whereby selection and actuation of only a correct one of the keys corresponding to the bit of recorded information then in said station will complete one circuit to said driving means to thereby move said record means to position the next succeeding bit of information in said station.

2. Teaching apparatus, comprising: record means having discrete bits of information recorded thereon in predetermined related sequence; means defining a reference station; driving means for intermittently moving said record means along a predetermined path to successively position said recorded bits of information in said station; said record means comprising a card having visual information imprinted thereon; additional information, related to said visual information, imprinted along an edge portion of said card, said bits of recorded information comprising signal means on said card, each discrete bit corresponding to a portion of said additional information; means adjacent said path concealing said additional information on one side of said station, whereby successive portions of said additional information are visible only after the corresponding recorded bit has passed through said station; a plurality of sensing means in said station; a plurality of circuits for energizing said driving means, said sensing means being responsive to the recorded bit of information therein, for closing a portion of one of said circuits; a keyboard having a plurality of keys bearing certain indicia related to the bits of information on said record means and each of which, when activated, closes another portion of one of said circuits, whereby selection and actuation of only a correct one of the keys corresponding to the bit of recorded information then in said station will complete one circuit to said driving means to thereby move said record means to position the next succeeding bit of information in said station.

3. Apparatus as defined in claim 2 wherein said bits of recorded information comprise perforations in said card; said sensing means comprising switches adapted to be closed in response to positioning said perforations in said station.

4. Apparatus as defined in claim 3 wherein said card includes means for actuating said driving means in response to positioning a card in said path adjacent said station whereby said card is moved to position the first bit of recorded information in said station independently of actuation of any of said keys.

5. Teaching apparatus comprising: a cabinet having a group of indicia-bearing keys constituting a keyboard; a first compartment in said cabinet for holding a supply of record material containing indicia corresponding to the indicia on certain of said keys; a second compartment in said cabinet for receiving used record material; advancing means operable by actuation of the keys of said keyboard in correct sequence with the indicia on said record material for intermittently advancing said record material, in steps, from said first to said second compartment along a path wherein said record material is visible to an operator of said keyboard.

6. Apparatus as defined in claim 5 wherein said record material comprises a plurality of cards stacked in said first compartment; advancing means being arranged to move only the top card of said stack along said path; and means urging said stack upwardly in said compartment to position successive individual cards in said path.

7. Apparatus as defined in claim 6 wherein said cards are provided with means cooperable with said advancing means for predetermining, at each step of advancement, which key of said keyboard must be actuated to produce the next step.

8. A record means for use with a teaching apparatus, comprising: a length of material having first visual information imprinted thereon; a plurality of columns of signal means thereon, each column being a coded bit of information related to said visual information; a further row of indexing signal means on said record means, said further row extending transverse to said plurality of columns and having therein a signal means in predetermined relation to each column of said plurality of columns.

9. A record means as defined in claim 8 wherein each of said signal means comrpises an opening through said length of material.

10. A record means as defined in claim 8 including additional information imprinted thereon identifying said first visual information, said additional information comprising discrete portions, each corresponding to the coded information in one of said columns.

11. A record means as defined in claim 8 wherein said length of material comprises a substantially stiff card.

* * * * *